United States Patent
Liu et al.

(10) Patent No.: US 10,646,849 B2
(45) Date of Patent: May 12, 2020

(54) CARBON MOLECULAR SIEVE ADSORBENTS PREPARED FROM ACTIVATED CARBON AND USEFUL FOR PROPYLENE-PROPANE SEPARATION

(71) Applicant: Dow Global Technologies LLC, Midland, MI (US)

(72) Inventors: Junqiang Liu, Midland, MI (US); Chan Han, Midland, MI (US); Janet M. Goss, Midland, MI (US); Edward M. Calverley, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 100 days.

(21) Appl. No.: 15/764,633

(22) PCT Filed: Sep. 8, 2016

(86) PCT No.: PCT/US2016/050695
§ 371 (c)(1),
(2) Date: Mar. 29, 2018

(87) PCT Pub. No.: WO2017/058486
PCT Pub. Date: Apr. 6, 2017

(65) Prior Publication Data
US 2018/0280927 A1   Oct. 4, 2018

Related U.S. Application Data

(60) Provisional application No. 62/234,701, filed on Sep. 30, 2015.

(51) Int. Cl.
*B01J 20/20* (2006.01)
*B01J 20/30* (2006.01)
(Continued)

(52) U.S. Cl.
CPC .......... *B01J 20/20* (2013.01); *B01J 20/2808* (2013.01); *B01J 20/2809* (2013.01);
(Continued)

(58) Field of Classification Search
None
See application file for complete search history.

(56) References Cited

U.S. PATENT DOCUMENTS 3,962,129 A * 6/1976 Munzner ................ B01D 53/02
502/401
4,261,709 A     4/1981 Itoga et al.
(Continued)

FOREIGN PATENT DOCUMENTS

EP   0119925 A2   9/1984
WO   2015130338 A1  9/2015

OTHER PUBLICATIONS

Second Examination Report relating to GCC Patent Application No. 2016-32054, dated Mar. 10, 2019.
(Continued)

*Primary Examiner* — Guinever S Gregorio
(74) *Attorney, Agent, or Firm* — Dinsmore & Shohl LLP

(57) ABSTRACT

A process to prepare a carbon molecular sieve adsorbent composition comprises steps beginning with an activated carbon having specific effective micropore size. The activated carbon is impregnated with monomers or partially polymerized polymer, allowed to complete polymerization, and then carbonized such that the impregnant shrinks the micropores to another specific effective micropore size. Finally, the impregnated/polymerized/carbonized product is annealed at a temperature ranging from 1000° C. to 1500° C., which ultimately and predictably shrinks the micropores to a size ranging from 4.0 Angstroms to 4.3 Angstroms. The invention surprisingly enables fine tuning of the effective
(Continued)

micropore size, as well as desirable selectivity, capacity and adsorption rates, to obtain highly desirable carbon molecular sieving capability particularly suited for use in, for example, fixed beds in pressure swing or temperature swing processes to enable propylene/propane separations.

6 Claims, 2 Drawing Sheets

(51) Int. Cl.
*B01J 20/32* (2006.01)
*B01J 20/28* (2006.01)
*C01B 32/306* (2017.01)
*C01B 32/05* (2017.01)
B01D 53/04 (2006.01)
B01D 53/047 (2006.01)
B01D 53/02 (2006.01)

(52) U.S. Cl.
CPC ..... *B01J 20/28061* (2013.01); *B01J 20/3078* (2013.01); *B01J 20/3204* (2013.01); *B01J 20/324* (2013.01); *B01J 20/327* (2013.01); *B01J 20/3272* (2013.01); *C01B 32/05* (2017.08); *C01B 32/306* (2017.08); B01D 53/02 (2013.01); B01D 53/047 (2013.01); B01D 53/0462 (2013.01); B01D 2253/102 (2013.01); B01D 2253/308 (2013.01); B01D 2257/7022 (2013.01); *C01P 2006/12* (2013.01); *C01P 2006/16* (2013.01)

(56) References Cited

U.S. PATENT DOCUMENTS

| 4,526,887 | A | * | 7/1985 | Sutt, Jr. | B01D 15/00 502/420 |
| 4,528,281 | A | * | 7/1985 | Sutt, Jr. | B01D 15/00 502/402 |
| 4,594,163 | A | * | 6/1986 | Sutt, Jr. | C01B 32/306 208/310 R |
| 4,629,476 | A | * | 12/1986 | Sutt, Jr. | B01D 53/02 95/138 |
| 6,916,358 | B2 | * | 7/2005 | Nakamura | B01D 53/02 502/416 |

OTHER PUBLICATIONS

Examination Report relating to GCC Patent Application No. 2016-32054, dated Nov. 27, 2018.
Breck, D.W., "Zeolite Molecular Sieves: Structure, Chemistry and Use", Adsorption by Dehydrated Zeolite Crystals, Table 8.14, 1974, 636.
Fuertes et al. "Carbon Molecular Seieve Gas Separation Membranes Based on Poly(Vinylidene Chloride-co-vinyl Chloride)", Carbon, 2000, 38, 1067-1073.
International Search Report and Written Opinion pertaining to PCT/US2016/050695 dated Jan. 2, 2017.
International Preliminary Report on Patentability pertaining to PCT/US2016/050695 dated Dec. 13, 2017.
Lamond et al., "6A Molecular Sieve Properties of Saran-Type Carbons", Carbon, 1965, 3, 59-63.
Liu et al., "A New Carbon Molecular Sieve for Propylene/Propane Separations", Microporous Mesoporous Mater., 2015, 206, 207-216.
Munakata et al., "Screening Test of Adorbents for Recovery of Krypton", Journal of Nuclear Science and Technology, Jan. 2000, 37:1, 84-89.
Staudt-Bickel et al., "Olefin/Paraffin Gas Separations with 6FDA-based Polyimide Membranes", Journal of Membrane Science, 2000, 170, 205-215.
Walker et al., "The Preparation of 4A and 5A Carbon Molecular Sieves", Carbon Molecular Sieves, Proc. 2nd Conf. Ind. Carbon and Graphite, London 1966, 7-14.

* cited by examiner

US 10,646,849 B2

CARBON MOLECULAR SIEVE ADSORBENTS PREPARED FROM ACTIVATED CARBON AND USEFUL FOR PROPYLENE-PROPANE SEPARATION

CROSS-REFERENCE TO RELATED APPLICATION

This application claims priority to U.S. Provisional Patent Application Ser. No. 62/234,701 filed Sep. 30, 2015, which is incorporated by reference herein in its entirety.

BACKGROUND

1. Field of the Invention

The present invention relates to the field of carbon molecular sieve adsorbents. More particularly, it relates to a process for preparing carbon molecular sieve adsorbents that includes annealing modified activated carbons to prepare adsorbents that are suitable to separate propylene and propane.

2. Background of the Art

Researchers have sought means to separate gas mixtures, either for use as starting materials or as products, for many years. Materials that have been of particular interest as means of such separations have been carbon molecular sieves (CMSs). These CMSs may be prepared from a variety of resins and are pyrolyzed at various temperatures and/or under various conditions. The pyrolysis reduces the resins to pure carbon, but maintains at least some porosity, in the form of micropores, in the pyrolyzed product. It is known that under some conditions the pyrolysis may shrink micropores to a desirable size. The CMSs thus formed may then be employed in conventional gas separations equipment, such as packed beds, columns, and the like, where the micropore size determines which gas in a gas mixture is adsorbed and which is not. Adsorption and desorption techniques may be alternated to carry out the separation, according to, for example, conventional pressure swing or temperature swing adsorption methods.

However, there is a particular challenge in the art to prepare CMSs having micropores of the correct size(s) for certain particular separations. Since the use of CMSs to accomplish separations assumes that the micropores are at least as large as, or larger than, the specified molecule that will enter the micropores, it is necessary to know the "size" of the molecule. Researchers have found different ways to determine that molecular size. One commonly employed approach has been to determine a given molecule's "kinetic diameter." A reference listing a variety of these kinetic diameters, based upon their use in zeolite applications, is D. W. Breck, *Zeolite Molecular Sieves: Structure, Chemistry and Use*, John Wiley & Sons, Inc. (New York 1974), 636, and these determinations are frequently used even with respect to non-zeolite, carbon molecular sieves that are known to have slit-shaped pores. In view of the above and for purposes hereof, then, the kinetic diameter, taken from the Breck reference cited supra, is used herein as the representative molecular diameter for propane $C_3H_8$, which is 4.3 Angstroms (Å). However, because the kinetic diameter given therein for propylene is believed by at least some researchers to be inaccurate for CMS materials per se, the Lennard-Jones collision diameters are used herein, instead of the Breck kinetic diameters, for propane $C_3H_6$, which is 4.0 Å. See, for example, Staudt-Bickel C., Koros W. J., "Olefin/paraffin gas separations with 6FDA-based polyimide membranes," *J. Membr. Sci.* (2000) 170 (2), 205-214 for further discussion. The kinetic diameters and Lennard-Jones collision diameters are referred to together as "representative molecular diameters."

A particular separation of interest to many for commercial application is the separation of propane ($C_3H_8$) and propylene ($C_3H_6$). Because the representative molecular diameter of $C_3H_8$ is 4.3 Å, and of $C_3H_6$ is 4.0 Å, the average micropore size of a suitable separation CMS for a mixture of these two gases desirably falls somewhere within the range from 4.0 Å to 4.3 Å. As used herein, "average micropore size" refers to the average micropore opening, i.e., width of a theoretical one-dimensional slit-pore, regardless of the possible actual overall configuration of the micropore.

A wide variety of CMS adsorbents have been prepared that are based upon pyrolysis of starting materials, such as SARAN-type polymers and other polymers and copolymers. Such include, for instance, Lamond T. G., et al., "6 Å molecular sieve properties of SARAN-type carbons," *Carbon* (1965) 3, 59-63. This article describes preparation of a CMS, from a polyvinylidene chloride (PVDC) copolymer, that rejects neopentane (6.0 Å) molecules, but adsorbs smaller molecules, such as, in non-limiting example, $CO_2$, butane, and iso-butane, non-selectively. In view of this the authors of that article concluded that their CMS had 6 Å micropores.

Another example is disclosed in Fuertes, A. B., et al., "Molecular sieve gas separation membranes based on poly (vinylidene chloride-co-vinyl chloride)," *Carbon* (2000) 38, 1067-1073. This article describes preparation of a composite carbon membrane using the aforesaid material. The membrane is formed with a thin microporous carbon layer (thickness of 0.8 micrometers, μm) obtained by pyrolysis of the polymeric film, supported over a macroporous carbon substrate (pore size 1 μm; macroporosity 30 percent, %). Single gas permeation experiments include helium (He), $CO_2$, oxygen ($O_2$), nitrogen ($N_2$) and methane ($CH_4$). Selectivities are described as particularly high for $O_2/N_2$ systems, i.e., a selectivity of about 14 at 25 degrees Celsius (° C.). From this information it can be inferred that the micropore size falls somewhere in a range from the representative molecular diameter of $O_2$ (3.46 Å) to that of $N_2$ (3.64 Å).

Walker, P. L.; Lamond, T. G. and Metcalfe, J. K., "The Preparation of 4 A and 5 A Carbon Molecular Sieves," *Carbon Molecular Sieves, Proc. 2nd Conf. Ind. Carbon and Graphite*, (London 1966) 7-14, discloses research in the 1960's on the use of activated carbons, generally having an average pore diameter larger than 20 Å, to form molecular sieves by coating an activated granular carbon with a partially polymerized solution, followed by curing and carbonization of the polymer coating. These new materials were called "Composite Carbon Molecular Sieves." They consisted of activated carbon covered by a layer of microporous carbon, the latter acting as a molecular sieve, and the former supplying much of the adsorptive capacity of the body. However, the authors expressed some uncertainty as to whether all of the adsorption was via formation of a pore wall monolayer, or via reversible capillary condensation within the pores. These were deemed to have significant advantages over so-called polymer carbon sieves (P.C.S.), which were carbons derived by pyrolyzing either thermosetting or thermoplastic polymers alone. The polymers used were polyfurfuryl alcohol (zinc chloride) carbons; polyfurfuryl alcohol (phosphoric acid) carbons; furfuryl alcohol-formaldehyde carbons; divinylbenzene carbons; and phenol-formaldehyde carbons. Activated carbon was combined with the appropriate monomers and the result carbonized at temperatures ranging from 500° C. to 850° C. (see Table III) to determine adsorption of $CO_2$, butane, isobutene or neopentane. Experiments were also done to illustrate the effects of different activated carbons (see Table IV) as (pre-carbonization) fillers for using the same selection of polymers. Butane, isobutane, neopentane, benzene, and cyclohexane were also tested for adsorption capacity. It was concluded that use of activated carbons with thermosetting organic polymers as the additional coating produced effective carbon molecular sieves.

U.S. Pat. No. 4,261,709 (Itoga, et al.) described a carbonaceous molecular sieve having micropores with diameters in the range of 4 Å to 6 Å, upon which bromine was adsorbed. The molecular sieves were allegedly capable of selectively removing low molecular weight organic gases such as ethylene, acetylene, methyl sulfide, acetaldehyde, etc., from air and other gases containing the same, with a reduced tendency toward deactivation.

In view of the above, there is clearly still a need for effective carbon molecular sieves having capability to separate propane and propylene, and which are desirably of relatively high selectivity, adsorbent capacity, and diffusion rate.

SUMMARY OF THE INVENTION

In one embodiment, a process to prepare a carbon molecular sieve adsorbent composition comprises: depositing polymer on an activated carbon, the activated carbon comprising micropores having, as a whole, an effective micropore size greater than 6 Angstroms, wherein the polymer is deposited in or around the micropores, the deposition being performed by either: (1) impregnating the activated carbon with at least one monomer and then polymerizing the at least one monomer such that the polymer is formed; or (2) impregnating the activated carbon with at least one partially polymerized monomer and allowing or facilitating completion of polymerization of the at least one partially polymerized monomer after impregnation such that the polymer is formed. The process further comprises carbonizing the activated carbon and the deposited polymer together to form a modified activated carbon having, as a whole, micropores that have an effective micropore size ranging from greater than 4.3 Angstroms to 6 Angstroms; and forming the carbon molecular sieve adsorbent composition by heating the modified activated carbon under an inert atmosphere and at a temperature ranging from 1000° C. to 1500° C., under conditions such that the effective micropore size is reduced to a range of from 4.0 Angstroms to 4.3 Angstroms.

In another embodiment, a carbon molecular sieve adsorbent composition may be prepared by a process comprising depositing polymer on an activated carbon, the activated carbon comprising micropores having, as a whole, an effective micropore size greater than 6 Angstroms, wherein the polymer is deposited in or around the micropores, the deposition being performed by either: (1) impregnating the activated carbon with at least one monomer and then polymerizing the at least one monomer such that the polymer is formed; or (2) impregnating the activated carbon with at least one partially polymerized monomer and allowing or facilitating completion of polymerization of the at least one partially polymerized monomer after impregnation such that the polymer is formed. The process further comprises carbonizing the activated carbon and the deposited polymer together to form a modified activated carbon having, as a whole, micropores that have an effective micropore size ranging from greater than 4.3 Angstroms to 6 Angstroms; and forming the carbon molecular sieve adsorbent composition by heating the modified activated carbon under an inert atmosphere and at a temperature ranging from 1000° C. to 1500° C., under conditions such that the effective micropore size is reduced to a range of from 4.0 Angstroms to 4.3 Angstroms.

DETAILED DESCRIPTION OF THE EMBODIMENTS

Figure 1:
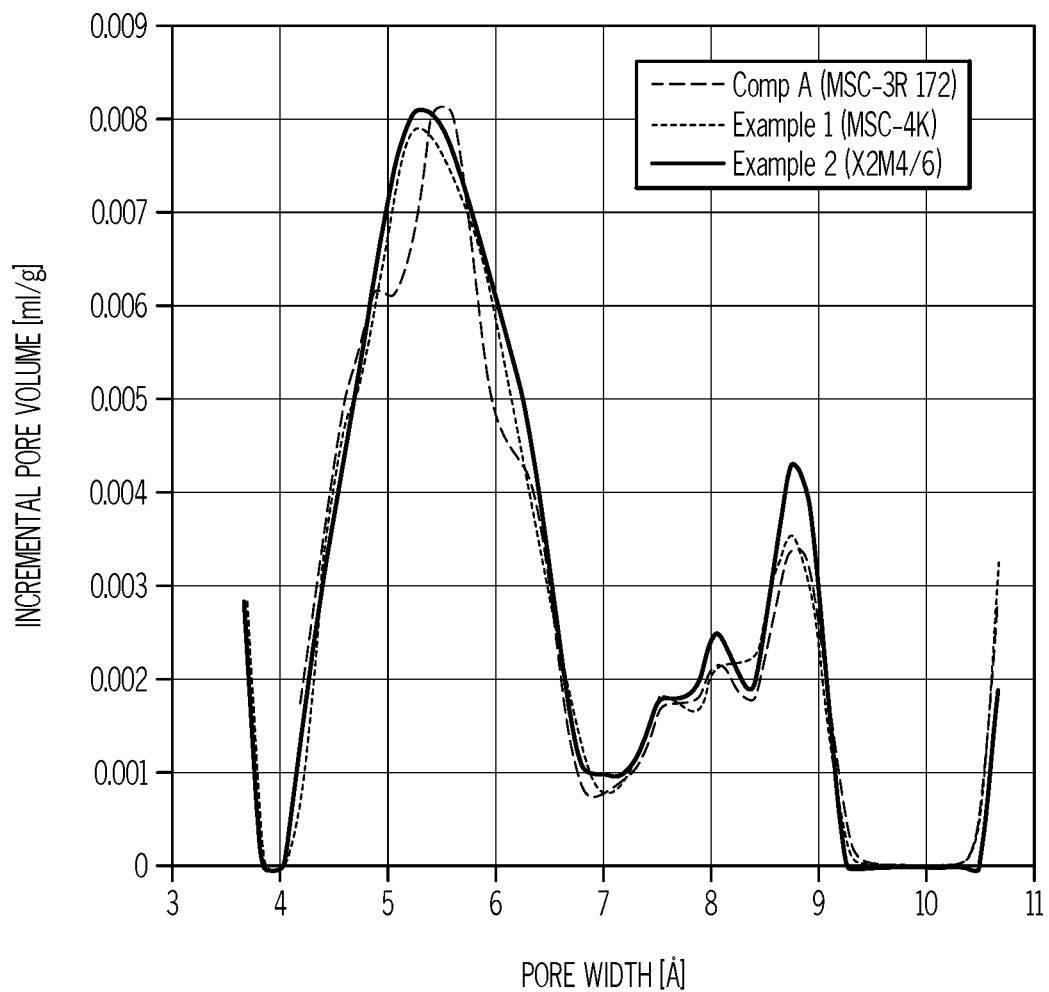
FIG. 1 shows the micropore size distribution of example and comparative modified activated carbon precursors based on $CO_2$ adsorption at 0° C. as determined using a density function theory (DFT) model.

The present inventions offers a relatively simple, convenient and inexpensive process for preparing carbon molecular sieve adsorbent compositions having effective micropore sizes ranging from 4.0 Å to 4.3 Å, which results in a product that is suitable for separations of pairs of molecules wherein one molecule falls within this range and one molecule falls outside of it. A particularly useful example is the separation of propane and propylene, which are known to be relatively difficult to separate by some other means, such as cryogenic distillations, because of their close boiling points (propane's boiling point is −43° C., and propylene's boiling point is −47.7° C.), but which can be easily separated by use of the inventive carbon molecular sieve adsorbents in applications, such as, for example, pressure swing or temperature swing processes.

As the term is used herein, "effective micropore size" refers to an aggregate of particles having micropores that have a combination of micropore widths and micropore distribution such as to enable transient adsorption of a given gas at a rate that is sufficiently reduced in comparison with that of another gas, with the result that the gases can be substantially separated from one another simply by passage through such aggregate. This transient adsorption may alternatively be referred to as kinetic adsorption. It will therefore be understood that "effective micropore size" does not necessarily refer to an average, mean, maximum or minimum size of micropores. Effective micropore size may be conveniently determined by a high throughput (HTR) method which is described in greater detail hereinbelow. The phrase "as a whole" as used herein refers to the total sample under consideration.

The present invention uses as a raw material, and potential starting material, activated (or alternatively "active") carbon adsorbent. This material is alternatively termed "activated charcoal," "activated coal," "carbo activatus" or "AC filter," and is a particulate form of carbon that has been processed to have small micropores that increase the surface available for adsorption (or for other chemical reactions). Because of its extensive microporosity, activated carbon typically has a surface area, as measured by the nitrogen Brunauer-Emmett-Teller (BET) method (a standard gas adsorption method), in excess of 500 square meters per gram ($m^2/g$). In some cases the surface area may range up to 1500 $m^2/g$ or even higher. The high surface area alone may be sufficient to ensure its usefulness for certain applications, but in some instances further chemical treatment offers further enhanced adsorption properties.

Activated carbon may be prepared from charcoal, i.e., pyrolyzed carbonaceous source materials including coal, lignite and petroleum pitch, or from high porosity biochar, which is obtained by pyrolysis and activation of biomass such as nutshells, coconut husk, peat, wood, coir, and other plants or plant-based materials. Generally it may be prepared via, in one embodiment, physical reactivation, wherein the source material is exposed first to hot gases, then air is introduced to burn out the gases, which creates a graded, screened and de-dusted form of activated carbon. This can be accomplished either by carbonization, which typically involves pyrolyzing the selected source material at a temperature from 600° C. to 1000° C., usually in an inert atmosphere such as argon or nitrogen; or it may be accomplished via activation/oxidation, which involves exposing a raw material or an already-carbonized material to an oxidizing atmosphere, such as air or steam, at temperatures above 250° C., usually in the range of from 600° C. to 1000° C.

In another embodiment activated carbon may be prepared via chemical activation. In this method, prior to carbonization, the raw material is impregnated with chemicals such as an acid, a strong base, or a salt such as phosphoric acid, potassium hydroxide, calcium chloride, or zinc chloride. The raw material is then carbonized at lower temperatures, typically from 450° C. to 900° C. Chemical activation may be preferred over physical activation, in that lower temperatures and a shorter time may in that case be required to accomplish the activation.

Activated carbon may alternatively be conveniently obtained from a wide variety of commercial suppliers. Suppliers may include, for example, CALGON™ CORPORATION, Pittsburgh, Pa.; CABOT NORIT™ ACTIVATED CARBON, Marshall, Tex.; and others.

Granular/pelletized activated carbon for commercial packed bed applications most typically will be retained on a 50 (U.S.) mesh screen (0.297 mm). Smaller materials, which are crushed or ground sufficiently to enable them to pass through an 80 (U.S.) mesh sieve (0.177 mm), are classified as "PAC." PAC refers to "powdered activated carbons." In general, the granule/pellet size is not critical in this invention, as the key is to adjust the effective micropore size of the adsorbent. However, in consideration of packed bed applications, it is desirable that the activated carbon useful in this invention have an average particle size of at least 0.5 mm in order to appropriately manage the pressure drop as a feed moves through the packed bed.

It is particularly important that the activated carbon having an effective micropore size greater than 6 Å, preferably from 6 Å, preferably to 10 Å, more preferably to 8 Å.

Once the activated carbon has been selected and prepared or obtained, it is contacted via admixing with at least one monomer and a suitable polymerization catalyst. The monomer may be selected from the group consisting of furfuryl alcohol; formalin; divinylbenzene; phenols (in non-limiting examples, phenol, cresol, xylenol, and the like); aldehydes (in non-limiting examples, formaldehyde, acetaldehyde, benzaldehyde, and the like); and combinations thereof. These monomers are suitable to prepare, respectively, polymers of furfuryl alcohol; of furfuryl alcohol-formaldehyde; of polydivinyl-benzene; of phenolics; and combinations thereof. These monomers and their resulting polymers are selected in view of their suitability to impregnate the activated carbon's micropores, which initially have an effective micropore size greater than 6 Å, such that the effective micropore size is reduced by the impregnation to a range of from 4.3 Å to 6 Å. It is also important that the polymer can be and is converted by pyrolysis, following impregnation, to a carbon-only material, to ensure that the final carbon molecular sieve adsorbent composition is entirely carbonaceous. Thus, the polymers listed hereinabove are known to meet the relatively restrictive requirements as to molecular size, composition following pyrolysis, and reduction of effective micropore size as a result of pyrolysis.

Essentially any suitable polymerization catalysts may be used. For example, such may be selected from alkali catalysts, such as sodium hydroxide, potassium hydroxide, zinc chloride, phosphoric acid, calcium hydroxide, ammonia, etc., or acid catalysts, such as hydrochloric acid, nitric acid, sulfuric acid, phosphoric acid, boric acid, oxalic acid, succinic acid, and the like. Such catalysts are particularly well suited for preparation of the phenolic polymers, for example, polymers that include as monomers at least phenol, and which may also include formaldehyde with the alkaline catalysts being preferred therefor. In contrast, acids and/or acidic salts such as hydrochloric acid, nitric acid, sulfuric acid, phosphoric acid, oxalic acid, succinic acid, boric acid, zinc chloride, magnesium chloride, and the like, may be employed as polymerization catalysts when the selected monomers are destined for the formation of furan polymers such as furfuryl alcohol-based homopolymers or copolymers, or fururyl alcohol-formaldehyde copolymers.

The amount of catalyst preferably selected will also vary depending upon the selected monomers. For example, where it is desired to form a phenol-based polymer, it is preferred to use an alkali catalyst in an amount of from 1 percent by weight (wt %) to 10 wt %, based on the weight of the catalyst and all monomer(s) combined. However, if an acid catalyst is selected for formation of the same phenol-based polymer, it is preferably used in an amount of from 2 wt % to 30 wt % on the same basis. In contrast, for preparation of the furan-based polymers, acid catalyst(s) is/are preferably selected and may be employed in a range of from 0.1 wt % to 1.0 wt %, preferably from 0.5 wt % to 1.0 wt %, based on the weight of the catalyst and all monomer(s) combined.

Determination of the amount, in grams, of the carbon-forming polymer and/or monomer to be employed as an impregnant in the activated carbon may be accomplished via calculation based upon the volume of micropores smaller than 300 Å in the precursor activated carbon, as measured by the nitrogen Brunauer-Emmett-Teller (BET) method. The amount of carbon formed by pyrolysis of the polymer (as impregnated or as polymerized from the impregnated monomer) is desirably within a range of from 0.1 g/cm$^3$, preferably from 0.3 g/cm$^3$, to 1.0 g/cm$^3$, preferably to 0.7 g/cm$^3$, based on the volume of micropores with diameters less than 300 Å in the precursor activated carbon. In order to accomplish this it is desirable to employ from 0.1 g/cm$^3$, preferably from 0.3 g/cm$^3$, to 2.0 g/cm$^3$, preferably to 1.5 g/cm$^3$, of starting monomers based on the volume of micropores in the activated carbon having diameters less than 300 Å.

It is noted in particular that impregnation does not necessarily mean that all of the activated carbon's micropores are coated or filled, but rather that the overall effect of the presence of the formed polymer is such that the effective micropore size of the sample, as a whole, is reduced to fall within the defined range. In some embodiments this means that a significant portion of the micropores will be filled or otherwise reduced in size, and in other embodiments a lesser portion of the micropores will be affected, depending upon the starting activated carbon, the sizes and distributions of micropores, the molecular sizes of the monomer and resulting polymer, the conditions of polymerization, and the like. Those skilled in the art will be able to easily determine, via routine experimentation, the resulting effective micropore size obtained via each type of polymer and polymerization as such affect a given activated carbon, and a more detailed description of such is beyond the needs of the present application.

In accomplishing the polymerization any effective process known to those skilled in the art may be elected. These may be selected from solution polymerization, emulsion polymerization, suspension polymerization or precipitation polymerization, and the resulting polymers may be homopolymers or copolymers, via known addition or condensation reactions. Photopolymerization is also contemplated herein. In one embodiment, and for convenience, it is desirable to incorporate the phenolic or furan monomers in a suitable solvent such as water, methanol, benzene, creosote oil or the like, in order to prepare a solution. Thereafter the activated carbon is sprayed with, dipped in, or admixed with the solution to continue the impregnation. Alternatively, the starting monomer(s) and/or partially polymerized polymer(s) may be adsorbed and supported on the activated carbon in gaseous phase.

Conditions for contact of the selected activated carbon, monomer(s), and polymerization catalyst(s) may include a temperature ranging from 50° C. to 350° C., preferably from 50° C. to 250° C., more preferably from 50° C. to 150° C., and most preferably from 50° C. to 100° C. Pressure for the impregnation and polymerization is not critical, but may range from 0.1 megapascal (MPa) to 10 MPa (from 1 atmosphere, atm, to 100 atm). The time needed for the impregnation and polymerization step depends on the type of monomers, catalyst, and temperature. Time ranging from 0.1 hour (h) to 10 h is preferred for the ease of control and economics of the process, by adjusting the polymerization conditions. Generally the impregnation is done as a batch process by introducing the monomer solutions into the packed bed of precursor active carbons. A single pass or multiple pass batch process can be used for this impregnation/polymerization step.

The activated carbon coated with polymer is then heated to carbonize the impregnant polymers in the temperature range of from 400° C. to 1000° C. This is typically carried out in a stream of inert gas, such as, for example, nitrogen, argon, helium, carbon dioxide, or in an alternative embodiment, under vacuum. Those skilled in the art will be well aware of means and methods to accomplish this carbonization, but additional detail may be sought from, for example, U.S. Pat. No. 4,261,709, if desired.

Following the impregnation/polymerization/carbonization treatment of the selected activated carbon, the resulting product, now referred to as "modified activated carbon," has an effective micropore size that has been reduced to fall within a range of from greater than 4.3 Å, preferably from 4.5 Å, to 6 Å, preferably to 5.5 Å. It is preferred that the modified activated carbon has a nitrogen BET surface area of at least 200 m$^2$/g, more preferably at least 300 m$^2$/g, and most preferably at least 500 m$^2$/g.

Non-limiting examples of activated carbons that are available in suitably modified form via an impregnation/polymerization/carbonization treatment such as is described hereinabove include X2M4/6, with an effective micropore size of approximately 5.50 Å; and MSC-4K, with an effective micropore size of approximately 4.65 Å. Both of these are commercially available from JAPAN ENVIROCHEMICALS™ LTD., Osaka, Japan.

At this point, the modified activated carbon is ready for the final process step, which is annealing, which is defined as heating under an inert atmosphere. This annealing is carried out by heating the modified activated carbon at a temperature ranging from 1000° C. to 1500° C. under an atmosphere that is preferably nitrogen or argon, for reasons of convenience and cost, but which may in alternative embodiments be helium, carbon dioxide, or alternatively under vacuum. The annealing within the given temperature range may be carried out for any suitable time and under any other suitable conditions, such as pressure, that are effective to reduce the effective micropore size to within the range of from 4.0 Å to 4.3 Å. In preferred embodiments achievement of an effective micropore size within this size range results in a final, and inventive, CMS adsorbent composition having a desirably high propylene/propane selectivity and also a desirably high adsorption capacity. Those skilled in the art will recognize that the fact that the inventive compositions may desirably exhibit or offer at least one specific property selected from (1) an effective micropore size from 4.0 Å to 4.3 Å; (2) a propylene/propane selectivity equal or greater than 10; (3) a propylene adsorption capacity equal to or greater than 1 wt % at a pressure of 0.4 MPa (4 atm) and a temperature of 35° C.); (4) an adsorption rate such that the composition can reach 50% of equilibrium propylene adsorption in 10 minutes or less; and (5) combinations thereof, means that the inventive compositions may be highly desirable for use in propylene/propane separations. Furthermore, those skilled in the art will be aware of means and methods of further optimizing one or more of these properties if and in what application such may be desired, without further instruction herein.

For example, it has been found that in certain embodiments, annealing of the MSC-4K modified activated carbon, available from JAPAN ENVIROCHEMICALS™ LTD., Osaka, Japan, at a temperature of from 1000° C., preferably from 1050° C., to 1200° C., preferably to 1150° C., more preferably at approximately 1100° C., under a nitrogen atmosphere and at a pressure of 0.1 MPa (1 atm), for a period of time of approximately 0.25 h, is suitable to produce a CMS adsorbent composition of the invention having a desirably high propylene/propane selectivity, high propylene capacity, and also desirably high adsorption rate of propylene. In other embodiments, annealing of the modified activated carbon X2M4/6 material, also available from JAPAN ENVIROCHEMICALS™ LTD., at a temperature from 1200° C., preferably 1250° C., to 1400° C., preferably to 1350° C., and more preferably at approximately 1300° C., under a nitrogen atmosphere and at a pressure of 0.1 MPa (1 atm), for about 0.25 h, is also suitable to produce a CMS adsorbent composition of the invention. However, overall performance of the X2M4/6 annealed CMS adsorbent composition in comparison with the annealed MSC-4K annealed CMS composition may be somewhat reduced, as is shown in further detail in the Examples/Comparative Examples section hereinbelow.

The CMS adsorbent compositions of the invention are suitable for a variety of applications wherein separation of propane and propylene is desired. For example, such may be employed in fixed beds, in processes based upon temperature swing or pressure swing principles.

Examples 1 and 2 and Comparative Examples A and B

The following commercial activated carbon/polymer compositions are obtained:

Example 1: MSC-4K, a modified activated carbon precursor having an effective micropore size of 4.65 Å, available from JAPAN ENVIROCHEMICALS™ LTD., Osaka, Japan.

Example 2: X2M4/6, a modified activated carbon precursor having an effective micropore size of 5.50 Å, available from JAPAN ENVIROCHEMICALS™ LTD., Osaka, Japan.

Comparative Example A: MSC 3R-172, a modified activated carbon precursor having an effective micropore size of 3.74 Å, available from JAPAN ENVIROCHEMICALS™ LTD., Osaka, Japan.

Comparative Example B: CALGON™ X-TRUSORB™ 700, an activated carbon alone, without modification, available from CALGON™ CARBON CORPORATION, Pittsburgh, Pa.

Each of the above-described materials is subjected to a high temperature anneal in a graphite furnace. This is accomplished by first loading about 20 grams (g) of each sample in a graphite boat (4-inch×4-inch×0.5-inch). The boat containing each sample is heated according to these six (6) final peak temperatures (1000, 1100, 1200, 1300, 1400, and 1500° C.) at the same ramp rate (10° C./min) and hold time (15 min), with a 10 liters per minute (L/min) of nitrogen purge (one volume turnover in every 12 min). After annealing, the furnace is cooled at 10° C./min to 450° C., and then the furnace is allowed to cool from 450° C. to ambient temperature at a slower rate, due to the heat transfer limit. The annealing completes production of the annealed modified activated carbon of the invention.

A traditional equilibrium adsorption method, such as $CO_2$ adsorption using the density function theory (DFT) model is not effective to probe micropores smaller than about 7 Å, which control the molecular sieving properties of each composition. FIG. 1 illustrates the similarity in the micropore size distributions of the three commercial CMSs based upon this method, as employed at 0° C., despite the fact that they have dramatically different molecular sieving properties. In view of this, it is recommended that in order to determine effective micropore size, a method based upon transient adsorption, which takes into account the rate of adsorption and is therefore more accurate, be employed instead. For example, a high throughput transient adsorption method employing nine probe molecules is particularly useful to obtain the effective micropore sizes. For further discussion, see, for example, the method described in Liu, J., et al. High throughput development of one carbon molecular sieve for many gas separations. *Microporous Mesoporous Mater.* 2015, (206), 207-216.

The high throughput transient adsorption method is generally carried out in a High Throughput Reactor (HTR) system installed in a triple dry box. The HTR system consists of an array of 48 parallel 14-milliliter (mL) reservoirs. Optional stirring capability is removed because gas diffusion resistance in the overhead is considered to be negligible compared to that inside the adsorbent. The temperature and gas pressure for each reactor cell is individually monitored and controlled. Adsorbate gases are injected into each cell at a controlled pressure and temperature. The kinetic adsorption measurements are performed in the following sequence: (1) Load 1.00±0.05 g of adsorbent powder into the 14-mL high throughput cells; (2) Degas at 150° C. for 12 h by $N_2$ purge semi-continuously; (3) Introduce the $N_2$ gas to 150 pounds per square inch gauge (psig, 1.13 MPa) and monitor pressure drop for 4 h at 35° C. for the adsorption; (4) Heat to 150° C. for 12 h under $N_2$ purge for the desorption; (5) Repeat the adsorption step 3 and desorption step 4 using eight other gases (at initial pressures) in sequence: $CO_2$ (150 psig, 1.13 MPa), $CH_4$ (150 psig, 1.13 MPa), $C_2H_4$ (45 psig, 0.41 MPa), $C_3H_6$ (45 psig, 0.41 MPa), $C_2H_6$ (45 psig, 0.41 MPa), $C_3H_8$ (45 psig, 0.41 MPa), i-$C_4H_{10}$ (15 psig, 0.20 MPa), and $SF_6$ (sulfur hexafluoride) (45 psig, 0.41 MPa).

Assuming the ideal gas law, the adsorption capacity (w) can be calculated using Equation (1) where, $\Delta P$ is the change of the cell pressure; V is adsorption cell volume; m is weight of adsorbent; M is the molecular weight of adsorbate gas; R is the ideal gas constant; and T is temperature.

$$w = \frac{MV}{mRT} \Delta P \quad \text{(Equation 1)}$$

The adsorption rate half time (t0.5) is the time at which 50% of the pressure drop occurs during the adsorption process. Assuming Fickian diffusion, the diffusivity is inversely proportional to the t0.5 value. Selectivity for the gas pair A and B (Alpha A–B) is the product of the capacity ratio (wA/wB) and the adsorption rate ratio (t0.5B/t0.5A) of the two molecules as shown in Eq. (2).

$$\text{Alpha } A - B = \frac{w_A}{w_B} \times \frac{t_{0.5B}}{t_{0.5A}} \quad \text{(Equation 2)}$$

The effective micropore sizes of the adsorbents produced in these examples and comparative examples are estimated by examining the selectivities of all gas pairs (among the nine probe molecules) for each adsorbent. To estimate the effective micropore size of each adsorbent, first, all pairs of the probe gases having a selectivity that is greater than or equal to 10 are determined for each adsorbent. Of the gas pair that has a selectivity that is greater than or equal to 10, the smallest molecule rejected and the largest molecule adsorbed are selected as the defining molecule pair. Then, the average of this defining molecule pair's representative molecular diameters is considered to be equal to the effective micropore size of that particular adsorbent. For example, the smallest and the largest gas molecules that are rejected and accepted by the MSC-4K adsorbent are i-$C_4H_{10}$ (5.0 Å) and $C_3H_8$ (4.3 Å), respectively. Consequently, the effective micropore size of this particular adsorbent is estimated to be 4.65 Å.

Table 1 shows the transient adsorption of the defining gas pairs in all of the tested adsorbents (Example 1, MSC-4K, and Example 2, X2M4/6) and the modified activated carbon denominated as MSC 3R-172 (Comparative Example A or Comp A) and the activated carbon precursor denominated as CALGON™ X-TRUSORB™ 700, (Comparative Example B or Comp B). The measurement resolution is limited by the representative molecular diameters of the adsorbate molecules. When the micropore is sufficiently large such that it adsorbs even the probe molecule having the greatest diameter, $SF_6$ ($W_{SF6}$>2 wt %, t0.5 $SF_6$<5 minutes), the effective micropore size is defined as the molecular diameter of that molecule, i.e., of $SF_6$, or 5.5 Å, as there are no larger adsorbate molecules being tested herein.

TABLE 1

Effective micropore size using nine-adsorbate transient adsorption method

| Precursor | Temperature [° C.] | Defining pair [A-B] | Defining pair selectivit | Effective micropore size | Capacity A | Capacity B | t0.5 A [min | t0.5 B [min |
|---|---|---|---|---|---|---|---|---|
| Comp A (MSC | 800 | N2—CH4 | 56 | 3.72 | 1.3 | 1.3 | 1.2 | 68.0 |
| Comp A (MSC | 1000 | N2—CH4 | 39 | 3.72 | 1.1 | 1.5 | 0.5 | 27.5 |
| Comp A (MSC | 1100 | N2—CH4 | 83 | 3.72 | 1.5 | 0.9 | 1.5 | 74.0 |
| Comp A (MSC | 1200 | CO2—N2 | 40 | 3.47 | 6.6 | 1.2 | 6.0 | 42.0 |
| Comp A (MSC | 1300 | CO2—N2 | 15 | 3.47 | 2.4 | 0.2 | 44.0 | 50.0 |
| Comp A (MSC | 1400 | CO2—N2 | 17 | 3.47 | 1.2 | 0.2 | 19.0 | 50.0 |
| Comp A (MSC | 1500 | CO2—N2 | 25 | 3.47 | 1.1 | 0.2 | 28.0 | 50.0 |
| Example 1 | 800 | C3H8— | 16 | 4.65 | 1.7 | 0.2 | 16.4 | 30.0 |
| Example 1 | 1000 | C3H8— | 23 | 4.65 | 1.6 | 0.2 | 13.0 | 33.0 |
| Example 1 | 1100 | C2H6— | 27 | 4.2 | 1.5 | 0.6 | 5.6 | 63.0 |
| Example 1 | 1200 | N2—CH4 | 37 | 3.72 | 1.1 | 0.5 | 2.4 | 41.0 |
| Example 1 | 1300 | CO2—N2 | 12 | 3.47 | 4.2 | 0.6 | 18.6 | 33.0 |
| Example 1 | 1400 | CO2—N2 | 13 | 3.47 | 1.3 | 0.2 | 28.7 | 50.0 |
| Example 1 | 1500 | CO2—N2 | 16 | 3.47 | 1.0 | 0.1 | 26.0 | 50.0 |
| Example 2 | 800 | SF6— | — | 5.5 | 2.7 | — | 1.4 | — |
| Example 2 | 1000 | SF6— | — | 5.5 | 2.6 | — | 2.6 | — |
| Example 2 | 1100 | iC4H10— | 11 | 5.25 | 1.6 | 0.8 | 6.1 | 36.0 |
| Example 2 | 1200 | C3H8— | 29 | 4.65 | 2.0 | 0.4 | 6.2 | 36.0 |
| Example 2 | 1300 | C2H6— | 13 | 4.2 | 0.8 | 0.3 | 10.8 | 51.0 |
| Example 2 | 1400 | C2H4— | 25 | 4.2 | 0.7 | 0.1 | 11.0 | 38.0 |
| Example 2 | 1500 | CO2—N2 | 12 | 3.47 | 4.3 | 0.8 | 28.0 | 62.0 |
| Comp B (Calgon X-Trusorb 700) | 800 | SF6— | — | 5.5 | 11.7 | — | 4.0 | — |
| Comp B (Calgon X-Trusorb 700) | 1000 | SF6— | — | 5.5 | 11.4 | — | 3.9 | — |
| Comp B (Calgon X-Trusorb 700) | 1100 | SF6— | — | 5.5 | 11.0 | — | 3.7 | — |
| Comp B (Calgon X-Trusorb 700) | 1200 | SF6— | — | 5.5 | 10.7 | — | 3.1 | — |
| Comp B (Calgon X-Trusorb 700) | 1300 | SF6— | — | 5.5 | 8.8 | — | 2.8 | — |
| Comp B (Calgon X-Trusorb 700) | 1400 | SF6— | — | 5.5 | 7.6 | — | 2.7 | — |
| Comp B (Calgon X-Trusorb 700) | 1500 | SF6— | — | 5.5 | 8.3 | — | 2.8 | — |

*indicates $SF_6$ did not adsorb

Figure 2:
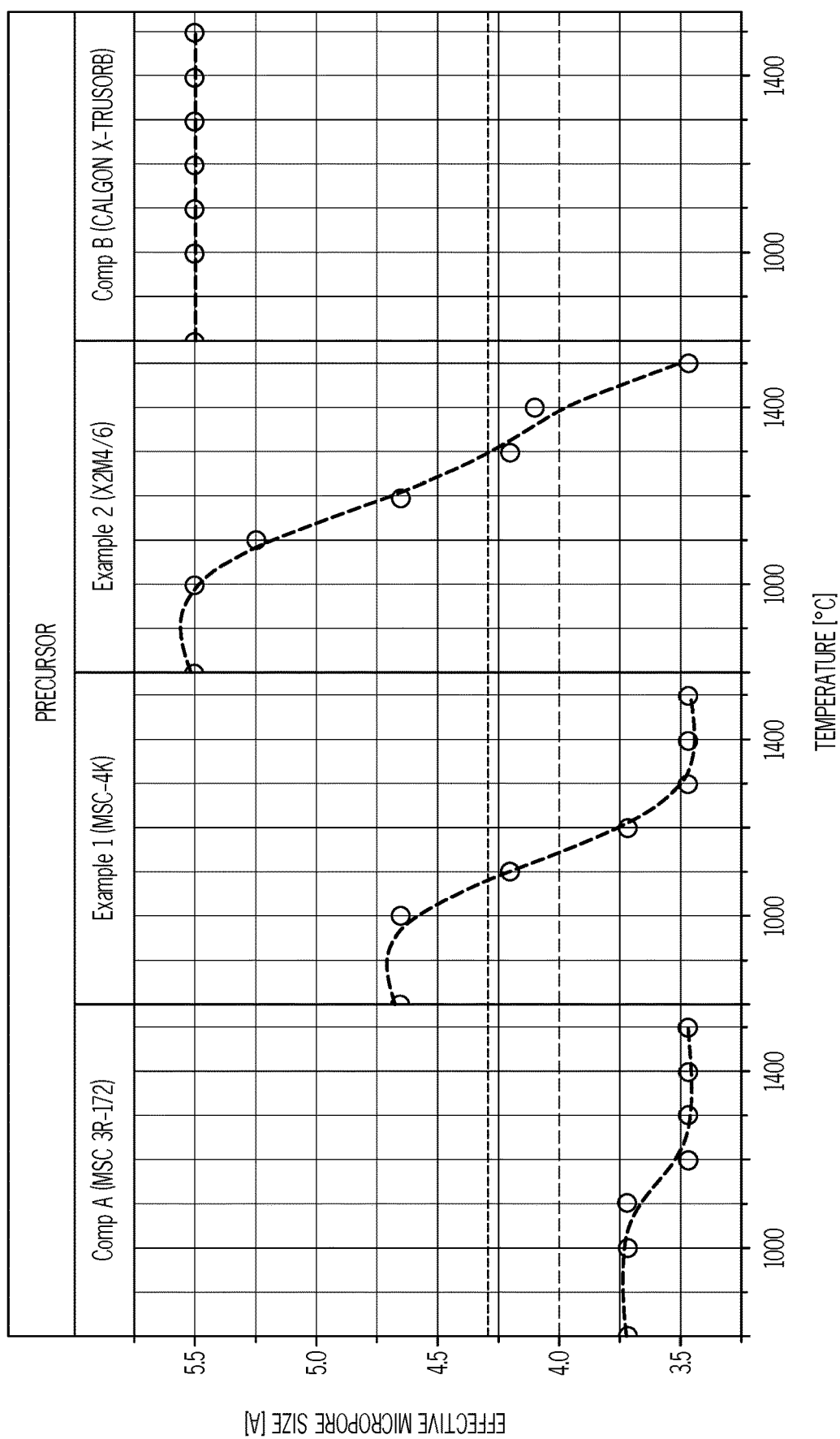
FIG. 2 shows the effective micropore size of example and comparative modified activated carbon precursors determined using a transient adsorption method.

FIG. 2 shows the change of effective micropore size in the four adsorbents tested, annealed at various temperatures. In all four cases, it is assumed that the activated carbon has gone through an 800° C. heating, which is a typical temperature for commercial activated carbon production processes.

In Comparative Example A, the MSC 3R-172 product, a modified activated carbon, its known to have an effective micropore size of 3.72 Å because it is used commercially for $O_2/N_2$ separations. As shown in TABLE 1, annealing of MSC 3R-172 at all of the given temperatures ranging from 1000° C. to 1500° C. results in reducing the effective micropore size from 3.72 Å to 3.47 Å. This is because the MSC 3R-172 has a pre-anneal effective micropore size that is less than the desired minimum effective micropore size of 4.0 Å for propylene/propane separation, and annealing, not surprisingly, does not increase the pore size to the desired range. However, despite its known 3.72 Å pore size, the as-received MSC 3R-172 material is, surprisingly, relatively selective for propylene/propane, but has a relatively low propylene adsorption capacity and extremely slow propylene adsorption rate (as shown by the large value of t0.5 $C_3H_6$). Annealing MSC 3R-172 adsorbents within the given temperature range, however, does not improve, but rather further lowers the sample's adsorption capacity and rate. Therefore, it is concluded that annealed MSC 3R-172 does not form an inventive annealed modified activated carbon composition, i.e., the inventive CMS adsorbent composition, and is not suitable for propylene/propane separations.

In contrast, Example 1's MSC-4K modified activated carbon has a pre-anneal effective micropore size of 4.65 Å, and annealing at a temperature in the range of from about 1000° C. to about 1200° C. under a nitrogen atmosphere successfully shrinks the effective micropore size such that it falls within the range of from 4.0 Å to 4.3 Å. TABLE 2 also shows that the pre-anneal MSC-4K is only slightly selective for propylene/propane (Alpha is 9). After annealing at 1100° C., however, the MSC-4K material has a relatively high propylene/propane selectivity of 83. Furthermore, the propylene adsorption capacity remains high, and the high propylene adsorption rate is maintained. The high selectivity, high capacity and high adsorption rate make the MSC-4K CMS adsorbent, having been annealed at 1100° C., particularly suitable for propylene/propane separations.

Similarly, the modified activated carbon X2M4/6, in Example 2, has a pre-anneal effective micropore size of 5.5 Å, and annealing at a temperature in the range of from about 1200° C. to about 1400° C. successfully shrinks the effective micropore size such that it falls within the range of from 4.0 Å to 4.3 Å. TABLE 2 further illustrates that the as-received X2M4/6 precursor (no anneal) is not at all selective for propylene/propane. After annealing at 1300° C., however, the X2M4/6-based CMS adsorbent has a relatively high propylene/propane selectivity of 50. However, it is noted that while the X2M4/6-based CMS adsorbent maintains a relatively high adsorption capacity (1.88 wt %), this annealing results in an adsorption capacity that is lower than the adsorption capacity of the 1100° C. annealed MSC-4K CMS adsorbent. It is also noteworthy that the 1300° C. annealing reduces the MSC-4K CMS's adsorption rate by almost half (t0.5 increases from 3.0 min to 6.8 min), with the result that propylene adsorbs more rapidly into the 1100° C. annealed MSC-4K CMS adsorbent than it does into the X2M4/6 CMS adsorbent, However, the X2M4/6 CMS remains very capable of propylene/propane separations and is consequently an example of the invention.

Finally, Comparative Example B shows that the annealing treatment is not effective to tune the effective micropore size for the sample of unmodified activated carbon CALGON™ X-TRUSORB™ 700. The effective micropore size cannot be reduced to less than 5.5 Å via heating at any temperature within the defined range of from 1000° C. to 1500° C. Furthermore, its selectivity for propylene/propane (Alpha is 1) is not improved by the anneal portion of the process.

facilitating completion of polymerization of the at least one partially polymerized monomer after impregnation such that the polymer is formed;

carbonizing the activated carbon and the deposited polymer together at a temperature of from 400° C. to 1000° C. to form a modified activated carbon having, as a whole, micropores that have an effective micropore size ranging from greater than 4.3 Angstroms to 6 Angstroms; and annealing the modified activated carbon under an inert atmosphere and at a temperature ranging from 1000° C. to 1500° C. to form the carbon molecular sieve adsorbent composition having:

an effective micropore size of from 4.0 Angstroms to 4.3 Angstroms.

TABLE 2

Propylene/propane separation properties

| Precursor | Temperature [° C.] | CapacityC3H6 [wt %] | CapacityC3H8 [wt %] | t0.5-C3H6 [min] | t0.5-C3H8 [min] | Alpha C3H6—C3H8 [—] |
|---|---|---|---|---|---|---|
| Comp A (MSC | No anneal | 1.08 | 0.05 | 68 | 128 | 41 |
| Comp A (MSC | 1000 | 1.79 | 0.13 | 66 | 24 | 5 |
| Comp A (MSC | 1100 | 0.73 | 0.30 | 23 | 4.8 | 1 |
| Comp A (MSC | 1200 | 0.33 | 0.25 | 35 | 45 | 2 |
| Comp A (MSC | 1300 | 0.24 | 0.18 | 13 | 17 | 2 |
| Comp A (MSC | 1400 | 0.22 | 0.13 | 29 | 17 | 1 |
| Comp A (MSC | 1500 | 0.19 | 0.10 | 12 | 6.2 | 1 |
| Example 1 (MSC- | No anneal | 2.94 | 1.69 | 3.2 | 16.4 | 9 |
| Example 1 (MSC- | 1000 | 2.72 | 1.58 | 3.1 | 13 | 7 |
| Example 1 (MSC- | 1100 | 2.48 | 0.63 | 3 | 63 | 83 |
| Example 1 (MSC- | 1200 | 0.78 | 0.07 | 48 | 75 | 18 |
| Example 1 (MSC- | 1300 | 0.28 | 0.18 | 12 | 25 | 3 |
| Example 1 (MSC- | 1400 | 0.19 | 0.13 | 9.5 | 6.7 | 1 |
| Example 1 (MSC- | 1500 | 0.13 | 0.07 | 13 | 21 | 3 |
| Example 2 | No anneal | 3.72 | 3.17 | 3 | 2.6 | 1 |
| Example 2 | 1000 | 3.67 | 2.98 | 3.1 | 2.9 | 1 |
| Example 2 | 1100 | 3.34 | 2.55 | 5.9 | 5.3 | 1 |
| Example 2 | 1200 | 3.18 | 1.96 | 3.8 | 6.2 | 3 |
| Example 2 | 1300 | 1.88 | 0.28 | 6.8 | 51 | 50 |
| Example 2 | 1400 | 0.51 | 0.10 | 21.4 | 38 | 9 |
| Example 2 | 1500 | 0.27 | 0.13 | 19 | 42 | 4 |
| Comp B (Calgon X-Trusorb 700) | No anneal | 4.00 | 3.95 | 5 | 5 | 1 |
| Comp B (Calgon X-Trusorb 700) | 1000 | 5.56 | 5.31 | 4.2 | 4.4 | 1 |
| Comp B (Calgon X-Trusorb 700) | 1100 | 5.51 | 5.24 | 4 | 4.3 | 1 |
| Comp B (Calgon X-Trusorb 700) | 1200 | 5.59 | 5.26 | 3.9 | 4.2 | 1 |
| Comp B (Calgon X-Trusorb 700) | 1300 | 5.32 | 4.94 | 4 | 4.1 | 1 |
| Comp B (Calgon X-Trusorb 700) | 1400 | 5.05 | 4.61 | 4.4 | 4.4 | 1 |
| Comp B (Calgon X-Trusorb 700) | 1500 | 4.35 | 4.38 | 5.1 | 5.1 | 1 |

The invention claimed is:

1. A process to prepare a carbon molecular sieve adsorbent composition comprising:
   depositing polymer on an activated carbon, the activated carbon comprising micropores having, as a whole, an effective micropore size greater than 6 Angstroms, wherein the polymer is deposited in or around the micropores, the deposition being performed by either:
   (1) impregnating the activated carbon with at least one monomer and then polymerizing the at least one monomer such that the polymer is formed; or
   (2) impregnating the activated carbon with at least one partially polymerized monomer and allowing or 2. The process of claim 1 wherein the monomer is selected from the group consisting furfuryl alcohol; formalin; divinylbenzene; a phenol; an aldehyde; and combinations thereof.

3. The process of claim 1 wherein the polymer is selected from the group consisting of polymers of: furfuryl alcohol; furfuryl alcohol-formaldehyde; polydivinyl-benzene; phenolics; and combinations thereof.

4. The process of claim 1 wherein the activated carbon has a surface area of at least 500 m$^2$/g, and the modified activated carbon has a surface area at least 200 m$^2$/g, both as measured by a nitrogen Brunauer-Emmett-Teller method.

5. The process of claim 1 wherein the heating temperature is from 1100° C. to 1300° C.

6. The process of claim 1 wherein the carbon molecular sieve adsorbent composition has a property selected from the group consisting of: (1) a propylene capacity equal to or greater than 1 wt % at a pressure of 0.4 MPa pressure, and a temperature of 35° C.; (2) a time to reach 50% of equilibrium propylene adsorption of less than 10 minutes; or (3) both (1) and (2).

\* \* \* \* \*